United States Patent [19]
Pijanowski

[11] Patent Number: 5,271,705
[45] Date of Patent: Dec. 21, 1993

[54] FLAT BED

[76] Inventor: Joseph A. Pijanowski, 14351 Irving St., Brooksville, Fla. 34609

[21] Appl. No.: 865,960

[22] Filed: Apr. 9, 1992

Related U.S. Application Data

[63] Continuation-in-part of Ser. No. 818,173, Jan. 8, 1992.

[51] Int. Cl.$^5$ .............................................. B60P 3/12
[52] U.S. Cl. ............................... 414/563; 280/402; 224/42.06; 224/42.21
[58] Field of Search .............. 414/563, 426, 427, 428, 414/429, 430, 546, 729; 280/402; 224/42.06, 42.12, 42.21; 254/2 R, 3 R

[56] References Cited

U.S. PATENT DOCUMENTS

| | | | |
|---|---|---|---|
| 4,573,857 | 3/1986 | Porter, Sr. et al. | 414/563 |
| 4,634,337 | 1/1987 | Hamman | 414/563 |
| 4,679,978 | 7/1987 | Holmes et al. | 414/563 |
| 4,737,066 | 4/1988 | Allison, Jr. | 414/563 |
| 4,741,661 | 5/1988 | Carey | 414/563 |
| 4,761,111 | 8/1988 | Brown | 414/563 |
| 4,775,285 | 10/1988 | Zackovich | 414/563 |
| 4,795,303 | 1/1989 | Bubik | 414/563 X |
| 4,993,909 | 2/1991 | Hamman | 414/563 |
| 5,123,802 | 6/1992 | Bell | 414/563 |

Primary Examiner—Frank E. Werner
Attorney, Agent, or Firm—Dominik, Stein, Saccocio, Reese, Colitz & Van Der Wall

[57] ABSTRACT

A wheel lift assembly attachable to a hydraulic bar extending rearwardly from a tow truck comprising central coupling brackets removably attachable to the hydraulic bar of a tow truck; a central support mounted to the rearward end of the coupling brackets; a plurality of intermediate extender bars, each extender bar having a laterally interior end adjustably attached to the central support and also having a laterally exterior end; a pair of corner brackets, each having a lateral component with an interior end adjustably coupled to the exterior end of an adjacent extender bar and having a rearwardly extending component secured at a right angle with respect to the laterally extending component; a pair of J-shaped brackets each having an elongated section with an end mountable in the rearward component of the corner bracket and having a transverse section and a forwardly extending end section; and a pair of tire pads located at the internal extent of each J-shaped bracket and corner bracket in facing relationship for receiving the wheel of the vehicle to be transported.

4 Claims, 7 Drawing Sheets

FLAT BED

RELATED APPLICATIONS

This application is a continuation in part of U.S. patent application Ser. No. 07/818,173 filed Jan. 8, 1992.

BACKGROUND OF THE INVENTION

1. Field Of The Invention

The present invention relates to a wheel lift and, more particularly, to an improved apparatus for lifting vehicles by mechanisms of a J-shaped configuration, the mechanisms being repositionable into a plurality of configurations.

2. Description Of The Background Art

It is common to utilize a roll-back, flat-bed truck to quickly load and transport a car which has been disabled, in an accident, illegally parked, or which must be relocated from one sales area to another. In such situations, the transporting truck will be provided with a flat-bed. Flat-beds are normally movable with respect to the bed between a first or rest position on the truck frame and a second or loading position rolled-back and at an angle with respect to the frame so that the car to be transported may be moved thereon. Such beds are pivotable with respect to the truck between the two positions. In some instances the ramps are even capable of swiveling with respect to the truck in order to load cars oriented at awkward angles with respect to the location where the truck may position itself.

One of the more significant shortcomings of known devices is the inability to effect a swiveling motion of the bed when the bed is in the second or loading position, rolled back and tilted with respect to the truck. Such inability of prior art trucks renders them virtually incapable of conveniently loading a car parallel parked with its wheels locked in a turned position. If loading such a car is attempted, there is an undesired scraping of the tires on the ground during movement. In addition, prior tow trucks are not equipped with wheel lifts or extended utility that swivel.

A wide variety of approaches have been attempted in the prior art to overcome such problems. By way of example, note U.S. Pat. No. 2,786,590 to Edwards wherein a flat-bed may be variously repositioned with respect to a vehicle upon which it is positioned. Tilting is allowed in the truck loading embodiment, but without swiveling. In the rail car loading embodiment, swiveling is allowed only in association with an elevator-type arrangement.

In another patent of interest, U.S. Pat. No. 4,470,746 to Delachapelle a bed is pivotable with respect to a truck frame. The bed is also swivelable. But, as shown in FIG. 5, the swivel effecting mechanisms 109 are located at the level of the tires at the center of the frame. As a result, swiveling can only occur when the bed is on the frame which minimizes the utility of the apparatus. Further, no mechanisms are provided to tilt the bed independent of its orientation.

In another body or prior art, there are various devices for effecting the pivoting motion of a bed with respect to a truck frame but without a disclosure of the swiveling in combination with the pivoting in a compound motion. Note U.S. Pat. No. 2,179,611 to Ratcliffe; U.S. Pat. No. 2,621,814 to Lisota; U.S. Pat. No. 2,703,658 to Bazzell; U.S. Pat. No. 4,249,851 to Sedelmayer; U.S. Pat. No. 4,456,420 to Newhard; and U.S. Pat. No. 4,770,592 to Winter.

These various patents all disclose mechanisms which attempt to solve the problem addressed by the instant invention. All such prior art approaches, however, have failed to offer the benefits attendant with the present invention. The most superior roll-back, flat-bed truck is that disclosed in my prior patent, U.S. Pat. No. 5,011,362, the subject matter of which is incorporated herein by reference.

As illustrated by the large body of background art and commercial devices, efforts are continuously being made in an attempt to improve roll-back, flat-bed vehicles. No prior effort, however, suggests the present inventive combination of component elements arranged and configured as disclosed herein. Prior roll-back, flat-bed vehicles do not provide the benefits attendant with the present invention. The present invention achieves its purposes, objects and advantages over the prior art through a new, useful and unobvious combination of component elements, through the use of a minimum number of functioning parts, and through the use of only readily available materials and conventional components.

It is, therefore, an object of the present invention to provide a wheel lift assembly attachable to a hydraulic bar extending rearwardly from a tow truck comprising central coupling brackets removably attachable to the hydraulic bar of a tow truck; a central support mounted to the rearward end of the coupling brackets; a plurality of intermediate extender bars, each extender bar having a laterally interior end adjustably attached to the central support and also having a laterally exterior end; a pair of corner brackets, each having a lateral component with an interior end adjustably coupled to the exterior end of an adjacent extender bar and having a rearwardly extending component secured at a right angle with respect to the laterally extending component; a pair of J-shaped brackets each having an elongated section with an end mountable in the rearward component of the corner T-bracket and having a transverse section and a forwardly extending end section; and a pair of tire pads located at the internal extent of each J-shaped bracket and corner bracket in facing relationship for receiving the wheel of the vehicle to be transported.

It is a further object of the present invention to move a bed of roll-back, flat-bed vehicle in a compound sliding/tilting/swiveling motion to extend their utility.

It is a further object of the present invention to configure a hinge with one end secured in a first location and with the other end tiltable and with a swivel element for effecting a compound tilting/swiveling motion between elements coupled by the hinge.

It is a further object of the present invention to reduce the width of beds of roll-back, flat-bed trucks and to form such beds with a curved leading edge for elevated exhaust pipes and with lamps thereadjacent.

It is a further object of the present invention to strengthen the swivel mechanisms for roll-back, flat-bed trucks.

It is a further object of the present invention to load and transport cars more conveniently with a roll-back, flat-bed truck.

Lastly, it is an object of the present invention to lift vehicles by a wheel lift of a J-shaped configuration, the wheel lift being repositionable into a plurality of configurations.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiments in addition to the scope of the invention defined by the claims taken in conjunction with the accompanying drawings.

SUMMARY OF THE INVENTION

The present invention is defined by the appended claims with the specific embodiment shown in the attached drawings. For the purpose of summarizing the invention, the invention may be incorporated into an improved wheel lift assembly attachable to a hydraulic bar extending rearwardly from a tow truck comprising central coupling brackets removably attachable to the hydraulic bar of a tow truck; a central support mounted to the rearward end of the coupling brackets; a plurality of intermediate extender bars, each extender bar having a laterally interior end adjustably attached to the central support and also having a laterally exterior end; a pair of corner brackets, each having a lateral component with an interior end adjustably coupled to the exterior end of an adjacent extender bar and having a rearwardly extending component secured at a right angle with respect to the laterally extending component; a pair of J-shaped brackets each having an elongated section with an end mountable in the rearward component of the corner bracket and having a transverse section and a forwardly extending end section; and a pair of tire pads located at the internal extent of each J-shaped bracket and corner T-bracket in facing relationship for receiving the wheel of the vehicle to be transported.

The invention may also be incorporated into an improved wheel lift assembly comprising central bracket means; a central support mounted to the rearward end of the brackets means; a pair of corner T-brackets, each having a lateral component with an interior end adjustably coupled to the central support and having a rearwardly extending component secured at a right angle with respect to the laterally extending component; a pair of J-shaped brackets each having an elongated section with an end mountable in the rearward component of the corner T-bracket and having a transverse section and a forwardly extending end section; and means to releasably couple the central support corner T-brackets and J-shaped brackets.

The end section of each J-shaped bracket extends outwardly from the elongated section of the J-shaped bracket. The J-shaped bracket is positionable in any of a plurality of angular orientations with respect to its associated corner T-bracket. The assembly further includes an extender bar coupling each corner bracket with the central support, the corner bracket being positionable in any of a plurality of angular orientations with respect to the central support. The assembly further includes a bar with a hook coupleable in the central support in place of the extender bar, corner bracket and J-shaped bracket. The assembly further includes loops on the corner T-brackets and J-shaped brackets.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several figures.

DETAILED DESCRIPTION OF THE PREFERRED EMBODIMENT

Figure 1:
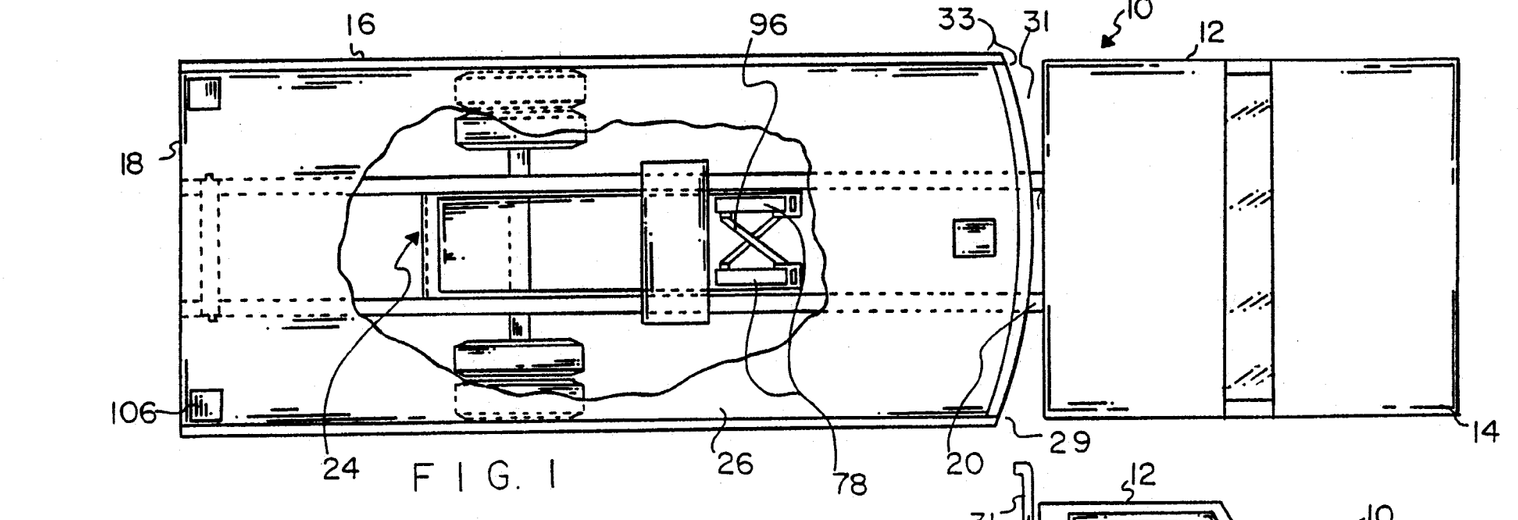
FIG. 1 is a plan view of a truck having a multi-positionable flat-bed constructed in accordance with the principles of the invention with parts broken away to show internal constructions thereof.

Shown in FIG. 1 is a roll-back, flat-bed truck 10 which illustrates the preferred embodiment of the invention. It should be appreciated, however, that the present invention is applicable to various other types of large vehicles capable of transporting smaller vehicles. By way of example, the invention is applicable to flat-bed trailers, rail cars and other large vehicles. In addition, smaller vehicles other than cars may be transported, as for example, small trucks, vans, motorcycles, etc.

Figure 2:
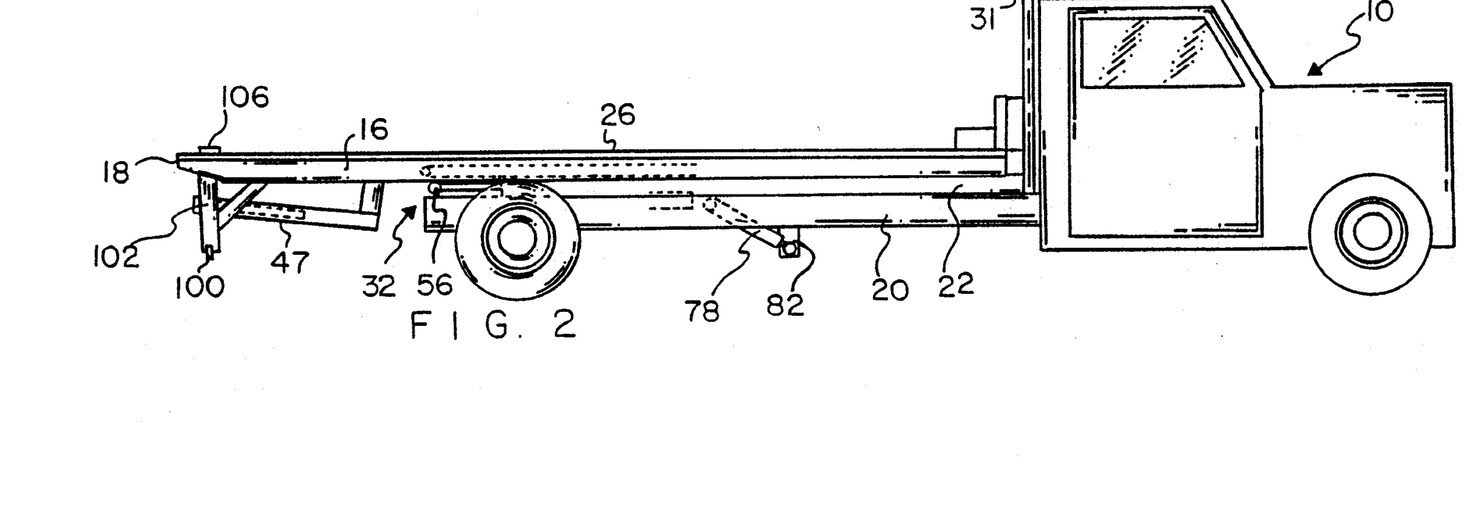
FIG. 2 is a side elevational view of the truck with the flat-bed as shown in FIG. 1.
Figure 3:
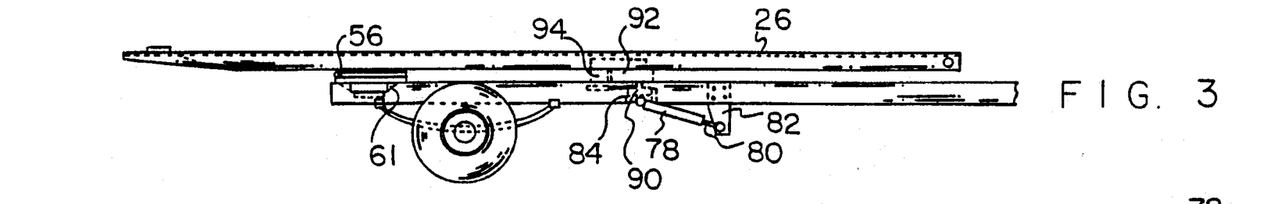
FIGS. 3 and 3A are, respectively, an enlarged side elevational view and a perspective view of the rear portion of the flat-bed as shown in FIG. 2.
Figure 3A:
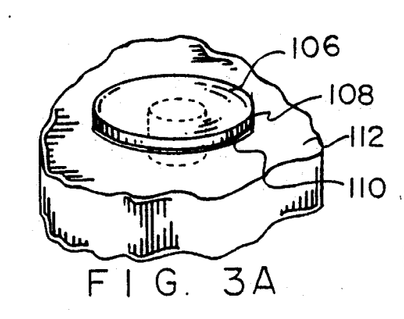
Figure 4:
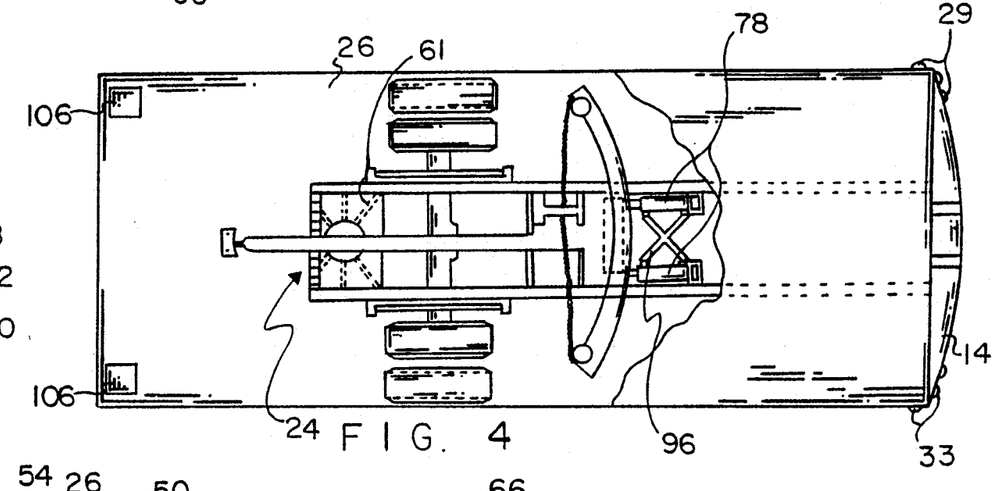
FIG. 4 is an enlarged plan view of the flat-bed shown in FIG. 3 with parts broken away to show internal constructions thereof.
Figure 5:
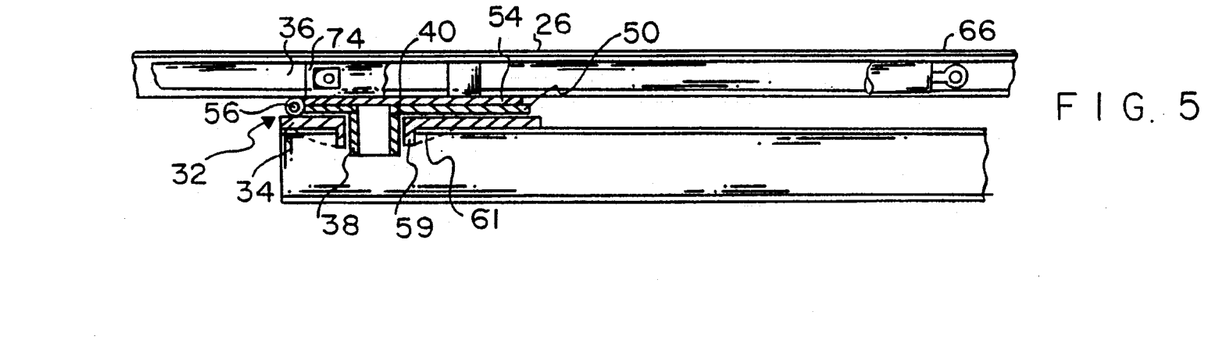
FIG. 5 is a sectional view of the hinge mechanisms of the flat-bed of FIGS. 1-4.
Figure 6:
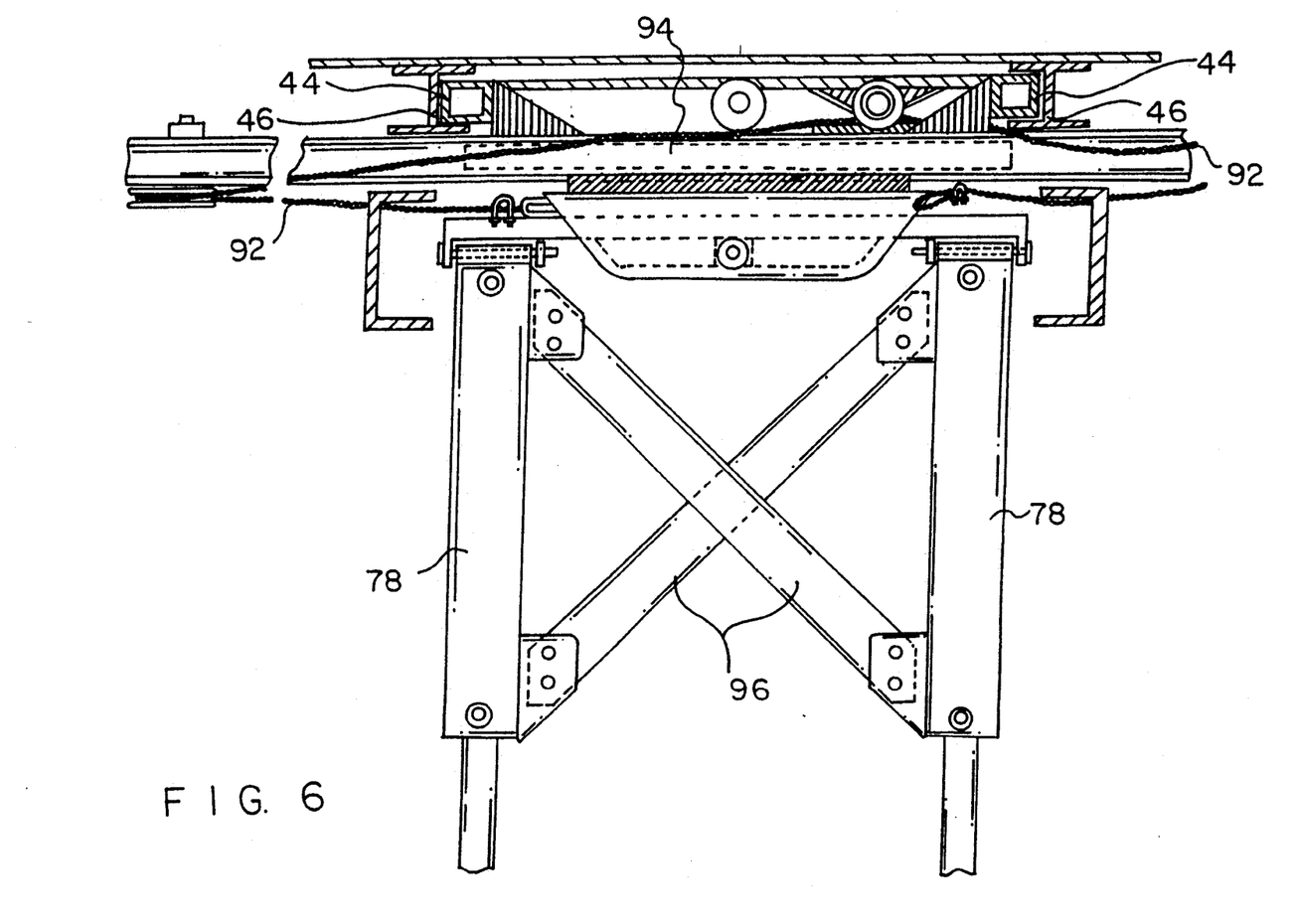
FIG. 6 is a sectional view of the motion imparting mechanisms for the elevating and swiveling of the flat-bed.
Figure 7:
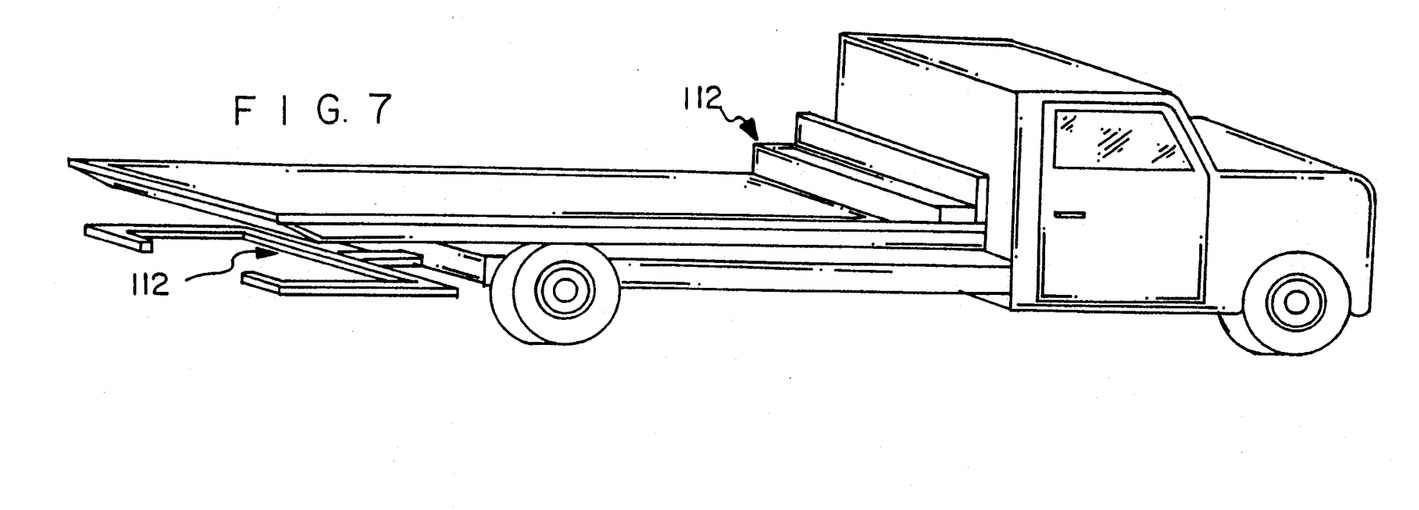
FIGS. 7, 7A and 7B are a perspective illustration of a tow truck constructed to include the wheel lift of the present invertion with certain components thereof shown enlarged.
Figure 7A:
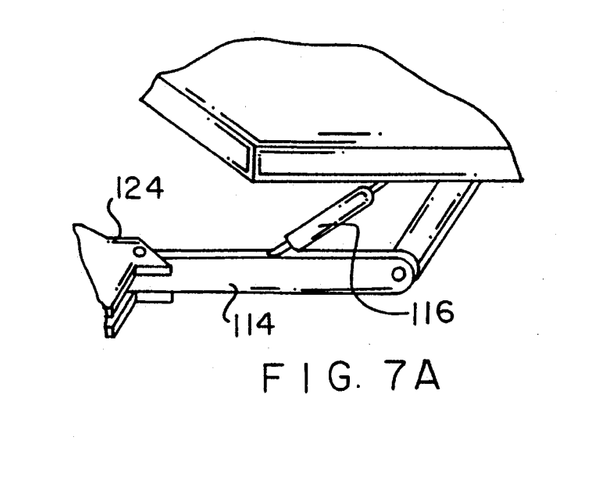
Figure 7B:
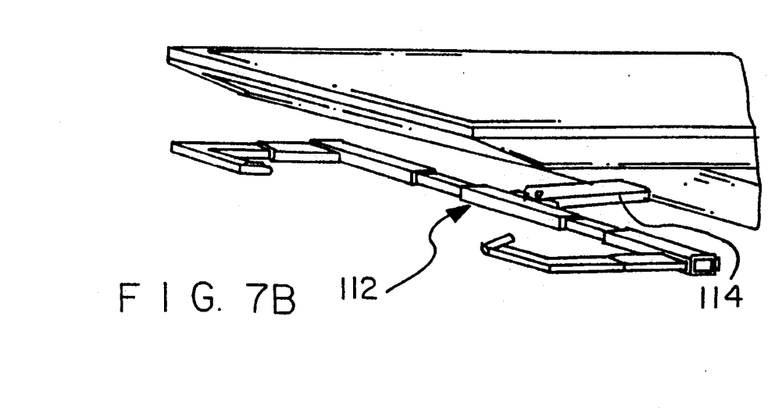

In the preferred embodiment of FIG. 1, the truck 10 is generally conventional and includes a cab 12 at the front end 14 and a frame 16 at the rear end 18. The frame is constructed of iron rails 20 with a generally flat upper surface 22. Such frame might be a flat, sheet metal member, but is preferably made up of linear rails and cross members as shown. The upper surface 22 constitutes a support for the unique motion imparting and guiding mechanisms 24 with the bed 26 located thereabove. The bed is essentially imperforate and has an upper surface for receiving the car or other smaller vehicle to be transported. The bed may be positioned in a first or rest orientation, as shown in FIGS. 1 and 2, or in a second or loading orientation. In the rest orientation, the bed is positioned parallel with, overlying and supported by the lower bed.

The leading edge 29 of the bed 26 is curved about an axis of rotation equivalent to the axis of rotation of the pivot point about which the bed swivels. The central extent of the leading edge of the bed is located adjacent to the rear edge of the cab. The lateral edges of the leading edge are spaced from the cab. This allows room for vertically extending exhaust pipes 31 to project upwardly for exhausting directly to the atmosphere rather than through the components of the bed and other mechanisms trailing the truck. This relationship also allows for the placement of lights 33 at the lateral edges on the leading edge of the bed for better viewing of the truck and bed by others to increase the safety of the system. In this regard, the width of the bed is reduced to seven feet four inches as compared to seven feet eleven inches which is standard. When compared to the normal cab width of six feet three inches, this is a reduction in width of the trailing components and bed for improved accessibility into tight places. Such reduction is a bed width reduction from 126.7 percent of the cab width to 117.3 percent.

Located between the bed 26 and the frame 20 are the mechanisms 24 for allowing a compound tilting and swiveling motion of the bed with respect to the frame of the truck. The mechanisms between the bed and frame include a hinge 32, a swivel plate 34 therebeneath, and an intermediate support 36 thereabove.

The swivel plate 34 is securely coupled to the upper surface of the bed 26 as by welding. It is preferably located at the rear end 18 of the frame 20 and truck, a location which extends utility to the mechanisms thereabove. A circular hole 38 extends through the swivel plate for receiving a swivel member 40 coupling the hinge 32 to the swivel plate 34 and the frame 20 of the truck 10.

The intermediate support 36 is preferably formed of iron rails secured together in a generally rectangular configuration and including rectangularly-shaped metal guide bars 44 extending along the length thereof. The intermediate support is located immediately beneath the bed 26 and above the hinge 32 to which it is secured through vertical rails 46 and coupled thereto as by welding. The guide bars 44 function to support the bed and guide it in its longitudinal motion toward and away from the cab 12.

Located between the intermediate support 36 and the swivel plate 34 is the hinge 32. The hinge has a first or lower hinge plate 50 formed with a downwardly extending circular tube which constitutes the swivel member 40. The upper hinge plate 54 is coupled to the intermediate support 36 as by welding. The hinge 32 overlies the swivel plate 34 and frame at its rearmost edge which are apertured with a downwardly extending outer tube for receiving the swivel member 40. The second or upper hinge plate 54 is pivotally coupled to the lower hinge plate through a hinge pin 56 located parallel with the rear edge of the truck and frame. This location of the hinge pin 56 allows for tilting of the upper hinge plate 54 with respect to the lower hinge plate 50 and frame 20 about a first or horizontal axis of rotation for increased freedom of tilting movement.

The swivel member 40 is circular in cross sectional shape to mate within the circular holes 38 and 52 within the lower hinge plate and the swivel plate 34. The upper and lower portions of the swivel member 40 extend with the upper enlarged portion above the lower hinge plate 50 and the lower enlarged portion beneath the swivel plate 34. This allows the hinge 32 and components thereabove, including the bed, to swivel with respect to the swivel plate, frame and truck. The swiveling is about a vertical axis extending through the center of the swivel member.

The hinge member 40 is preferably formed as an integral extension of the lower hinge plate 50. The hinge member is a tube with a downwardly extending circular cross-section. The hinge member is located in an aperture in the swivel plate 34. The aperture in swivel 34 is a tube shaped extension 38 of the swivel plate which extends downwardly with a circular exterior cross-section and a circular interior cross-section of such size as to receive the downwardly extending hinge member 40. By having the tubular extension 38 of the swivel plate 34 of an extended length, a greater bearing surface is provided between the hinge member 40 of the lower hinge plate and the swivel plate 34 for greater stability and smoother turning during operation and use. The lower edge of the hinge member 40 beneath the lower extent of the tubular extension 38 includes a face plate with removable bolts to preclude inadvertent lifting of the lower hinge plate and hinge from the swivel plate. Additional support is provided to the lower extension 38 of the swivel plate by radially extending triangular supports 61 between the lower surface of the bed and the exterior surface of the tubular extension 38. This precludes inadvertent movement of the tubular extension with respect to the bed and swivel plate for greater efficiency of the mechanisms during operation and use.

The bed is coupled to the hinge through the intermediate support 36. Coupling between the bed and intermediate support is effected through a pair of H-shaped iron rails depending from the lower surface of the bed in a parallel relationship to each other as well as to the longitudinal centerline of the intermediate support, bed, frame and truck. The iron rails have their recessed surfaces facing each other for receiving the rectangularly shaped iron rails 44 which are secured to the upper surface of the intermediate support. The H-shaped aluminum or iron rails 46 are adapted to be guided by the rectangularly shaped iron rails 44 for longitudinally moving the bed along its length.

The present apparatus allows for the utilization of a conventional tow bar 47. In the preferred embodiment, the tow bar includes an axially shiftable piston mounted at its forward end to the lower face of the frame. It is adapted to move in a three part, compound motion the same as the bed. Its rearward end is hydraulically controlled for linear movement. This construction allows for a second car to be towed behind the flat-bed at a safe distance to eliminate damage on turns while a first car is being transported on the bed.

The compound motion is imparted to the bed by a series of motion imparting mechanisms interrelated to allow the bed to be extended or rolled back rearwardly along the intermediate member away from the cab, this allows the bed to be pivoted about the horizontal axis of the hinge pin 56 for tilting the bed with respect to the frame of the truck. This occurs through the raising of the forward end of the intermediate support and bed. This also allows the bed and coupling mechanisms to rotate about the vertical axis of the swivel member for swiveling the bed and coupling mechanisms with respect to the frame of the truck. The three motion emparting mechanisms all function independently one with respect with the other. In this manner the swiveling or the tilting or the sliding may be done independently regardless of the position of the bed.

The first motion imparting mechanism is the slide piston 66. The slide piston has its cylinder pivotally coupled at its front end to a cross bar of the intermediate support through a clevis The reciprocal rod 72 of the slide piston 66 has its back end pivotally coupled to an intermediate cross bar 74 attached to the bed on its underside adjacent to the rear through a clevis. Movement of the rod 72 is under the control of the operator and is effected by introducing pneumatic or hydraulic fluid to one end of the cylinder or the other in the conventional manner as more fully described in the prior art as exemplified by the prior art as referred to hereinabove.

The second of the motion imparting mechanisms is the elevating pistons 78. The elevating pistons are a pair of conventional pistons located on opposite sides of the longitudinal centerline of the bed and frame. Each cylinder has its extension rod 80 pivotally coupled at its lower end to a lower portion of the frame through a clevis 82. The upper end of the cylinder of each elevating piston has its upper end pivotally coupled to a yoke 84. The yoke, in turn, is coupled to a support bar through a thrust pin to allow rocking of the support bar with respect to the yoke. The yoke and support bar are elevationally positioned by the elevating pistons 78. The yoke and support bar are not mounted for lateral movement or swiveling with the swiveling of the hinge or its related mechanisms. The support bar retains a motor 90 and pinion gear 92 for operatively coupling with a curved rack 94 on the underside of the intermediate support 36. Movement of the rods 80 of the elevating pistons is under the control of the operator and is effected by concurrently introducing the pneumatic or hydraulic fluid to one end of the cylinders or the other in the conventional manner as more fully described in the prior art as referred to hereinabove.

Associated with the elevating pistons 78 are a pair of braces 96. Each brace is coupled at its upper end to the upper end of its associated piston. The braces extend downwardly to a lower end beneath the top of the frame. When the elevating pistons rise to lift the bed, the interior edges of the braces slide against adjacent portions of the frame to add strength and rigidity to the cylinders. This strength and rigidity is especially important when the bed is driven to swivel during operation and use.

The braces 96 for the pistons are formed as a pair of linear channel irons in an "X" shaped configuration. Each is secured at one end to one end of a piston 78 and their other end to the other end of the piston. They are preferably bolted together centrally for a more secure coupling at minimum weight for effecting proper motion of the pistons 78 with respect to each other and the bed during movement with negligible movement of the pistons with respect to each other. Thereby eliminating racking of any swivel movement during operation in use.

The third of the motion imparting mechanisms is the rack 94 and cable 92. The rack is secured beneath the lower surface of the intermediate support while the cable is supported above the upper surface thereof. The rack is curved with its axis of rotation being the vertical axis of the swivel member. The rack and cable are located at the front end of the intermediate support 36. The winch is driven in one direction of rotation or the other by the motor 90 depending from, and supported by, the support bar 86. Movement of the winch and thus the cable and rack are under the control of the operator and is effected by energizing the motor in the conventional manner.

The pivoting of the support bar 86 with respect to the yoke 88 is to accommodate the rocking movement of the front end of the intermediate support 36 and bed 26 when they are swiveled with the bed tilted. Swiveling when tilted tends to raise the lower the opposite ends of the intermediate member and bed thus effecting their rocking. To maintain the pinion 92 in proper meshing contact with the cable of the rack 94 which has rocked from the horizontal, parallel with the truck frame, the pinion 92 is allowed to rock concurrently with the rack 94 under the influence of the rocking of the rack so that swiveling of the rack, intermediate member and bed may be properly effected.

The particularly disclosed rack and pinion mechanism is shown as the preferred embodiment for effecting the swiveling motion of the hinge, intermediate member and bed. It should be understood that a wide variety of other mechanisms could be utilized for such function. For example, a cable and worm gear, through a pulley assembly, could readily be utilized to move the bed and related mechanisms from one side to the other about the axis of the swivel member. In addition, such mechanisms could also be located at other than the front end of the bed and intermediate members, as for example, at or adjacent to the hinge.

The particular choice of materials utilized throughout the frame, bed and components in between are well within the purview of one skilled in the arts. Steel would be the most commonly used material for the parts of the present invention. It has been found, however, that aluminum may be readily utilized and constitutes the preferred embodiment for the materials of the bed, intermediate support, hinge and swivel plate. by using aluminum rather than steel for these parts, it has been found that their function may be maintained and may be accomplished with cheaper and lighter weight materials, for improved efficiency, cost savings, and less fuel consumption during operation and use. Further, it has been found that the contacting surfaces which slide one against the other should be well greased during operation and use, particularly, the area between the lower hinge half and the swivel plate. In addition, the area of contact between the rails of the bed and intermediate support should also be well greased. It has been found, however, that wear generated by sliding is reduced and ease of sliding increased if sheets of a lubricous material such as ultra-high molecular weight polyethylene or Nylatron G. S. are employed on the upper surface of the swivel plate and the lower surface of the lower hinge half as well as the areas of contact between the rails of the bed and intermediate support. Such lubricous materials add great utility, life and convenience to the present invention.

Each of the motion imparting mechanisms, the slide piston 66, the elevating pistons 78 and the rack 94 and pinion 92 may be activated and deactivated independently under the control of the operator. Consequently, any of the three motions, roll-back, elevating and swiveling may be imparted to the bed independent of the other two motions. In other words, the bed may be rolled forward to a rest position or rolled back to a loading position independent of the tilting or swiveling position. In addition, the bed may be tilted to an essentially horizontal position parallel overlying the bed frame when in the rest position or it may be tilted with its back end located downwardly as when in a loading position independent of the roll-back or swiveling position. Lastly, the bed may be swiveled from an aligned position wherein the longitudinal axis of the bed is aligned with the longitudinal axis of the frame and truck when in the rest position or it may be swiveled in either direction about the axis of the swivel member when in the loading position independent of the roll-back or tilting position.

Swiveling of the bed when in the loading position is allowed and facilitated by freely rotatable wheels 100 supported by legs 102 attached to the lower surface of the bed. In this manner, the swiveling may be effected with the ramp in its rest to tilted position for loading.

The method of movement of the bed before picking up cars or other vehicles is essentially that as described in my aforementioned application. In addition to the foregoing, resilient pads 106 are provided in the corners of the bed adjacent the rear edge thereof. Each pad includes a thick rectangular sheet 108 of elastomeric material, natural or synthetic. Secured therebeneath is a thick metallic plate 110. The thin plate therebeneath 112 is supported on the bed. A post extends downwardly from the upper plate 110 through an aperture in the lower plate 112 and through an aperture in the bed of the truck. In this manner, when the leading edge of the vehicle to be lifted is placed on the upper surface of the vulcanized sheet and the bed is swiveled, there will be a scraping motion at the interface of the thin and thick plates 110 and 112. A layer of grease is preferably provided therebetween. In this manner, there will be no scraping of the lower surface of the transported vehicle with respect to the corner of the bed of the truck when lifted and swiveled.

By such apparatus, a parked car may be moved from a parallel position between two adjacent cars and loaded onto a roll-back, flat-bed of the truck constructed in accordance with the principles of the present invention. The bed is first rolled back by activating the slide piston. The bed is then tilted by activating the elevating pistons. Lastly, the bed is swiveled so that its rear right corner is under the front left corner of the car to be moved. The rear end of the bed is then raised to elevate the front of the car. This is effected by lowering the elevating pistons so that the bed pivots about the hinge pin axis. With the car raised, the bed is then pivoted clockwise through the rack and pinion and associated motor to move the front of the car in a counter clockwise manner facing out of its parking place. The bed is then lowered by raising the elevating piston. The bed is then swiveled counter clockwise so that it is in alignment with the car. A conventional winch 106 attached to the front end of the bed is then utilized to pull the car to a central location on the flat-bed. The bed is then swiveled into alignment with the truck, rolled forward and then tilted to bring the bed and loaded car into the rest position for being transported. Because of the use of the urethane bumpers of cars, a car may be secured by a chain to slide out the car to eliminate damage to the urethane bumpers of the cars.

A car to be loaded similar to the above described method if its wheels are locked at an angle. The bed is first positioned in an angled loading position with the angle being aligned with the angle of the front tires. The winch is then utilized to pull the car partially up the bed. The rack and pinion and motor are then energized to align the bed with the truck and rear wheels of the car. The winch is once again energized to pull the car up the bed for being transported. If the car is a front wheel drive, the linkage can be disconnected on the underside of the car to use the bed and winch in the manner.

An alternate embodiment of the invention is shown in FIGS. 7 through 11. This embodiment relates to a wheel lift which is multi-use and multi-positionable and can be used to lift cars, trucks, motorcycles or the like, regardless of their position. According to such embodiment a conventional hydraulic bar 110 is provided at the rear of the vehicle 112. It is supported on a lower rear portion of the truck in the conventional manner for linear movement into and out of a rectangular supporting tube 114 by a conventional pneumatic cylinder, not shown. The tube 114 is pivoted at its forward end to effect elevational movement of its rearward end, up and down with respect to the truck, by a conventional pneumatic cylinder 116. At the rearward end of the hydraulic bar is an aperture 118 for coupling with the wheel lift assembly 120 of the present invention.

The wheel lift assembly 120 has on its forward end a pair of coupling brackets 124 with apertures 126 spaced a distance slightly greater than the thickness of the rearward end of the hydraulic bar 110. In this manner, the brackets 124 may be placed above and below the hydraulic bar 110 so that a swivel-enabling coupling pin 130 may be inserted through the apertures 126 of the coupling brackets 124 with the aperture 118 of the hydraulic bar 110 therebetween.

On the rearward end of the coupling brackets is the central support 134 shown in the preferred embodiment as a ¼-inch channel stock with a square 3-inch central opening along its axis. This support is about 32 inches in length and is centrally located with respect to the coupling brackets 124.

Located laterally outwardly of the coupling brackets are a pair of spaced intermediate extender bars 136. Each extender bar is about 36 inches in length and is fabricated of square 2½ inch channel stock with a 3/16-inch thickness. In this manner, the laterally interior end of each extender bar may be fitted within the 3-inch square channel stock of the central support 134. Each extender bar 136 may thus slide axially with respect to the central support for adjustment purposes to accommodate cars of different widths.

Located laterally outwardly of the extender bars are the corner brackets 140. Each corner bracket 140 has a laterally extending component 142 and a rearwardly extending component 144, all of ¼-inch channel stock. The lateral component 142 is 3-inch square while the rearwardly extending component 144 is 2½ inch square.

Both the central support 134 and the lateral component 142 of the corner bracket 140 are in axial alignment and are provided with apertures 144 for receiving a lock pin 146. A bolt or other coupling member could likewise be employed. On each extender bar are, on opposed faces thereof, a plurality of apertures 148 and 150. They are shown in the preferred embodiment as two aligned apertures 148 at the end adjacent to the central support and three aligned apertures 150 at the end adjacent to the corner bracket. In this manner, the corner brackets 140 and intermediate extender bars 136 may be moved inwardly or outwardly with respect to the center of the wheel lift assembly 112 for adjustable coupling for accommodating vehicles of varying widths.

Welded at the laterally exterior end of the lateral component 142 of each corner bracket is a rearwardly extending component 144. Each such component is about 18 inches in length and is fabricated of 3/16-inch channel stock with a square 2½ inch opening. Each rearward component 144 is about 24 inches in length and secured to the lateral component of the corner bracket so that they are canted with this respect to the horizontal, at an angle of between 5 and 10 degrees with respect to the corresponding lowermost surfaces of the corner bracket.

The last components of the wheel lift assembly 120 are the J-brackets 154. Each J-bracket 154 is fabricated of pieces of 2-inch channel stock, ¼-inch thick. Each J-bracket includes an elongated section 156 about 18 inches in length extending rearwardly and fabricated of a 2-inch channel bracket which is axially mountable inside the rearwardly extending component 144 of the corner bracket 140. Welded thereto is a transverse section 158 about 14 inches in length and a forwardly extending end section 160 about 4 inches in length. The end section 160 is angled inwardly toward the horizontal center line of the hydraulic bar 110 at between about 5 and 10 degrees.

The interior surfaces of the transverse section and the internal face of the corner bracket are adapted to support tire pads 164. Each pad 164 is fabricated of steel with an essentially planar wheel-receiving upper surface as is conventional in the art. Each tire pad has welded thereto a tubular support 166 along the majority of the width of the pad. The tire pads 164 are supported on pins 168, the ends of which are mounted through upstanding brackets 176 welded to the facing portions of the corner bracket 140 and J-bracket 154. This allows pivoting of the tire pads 164 to accommodate tires of different diameters. An aperture 168 in the rearwardly extending portion 144 of the corner bracket 140 and plural aligned apertures 170 in the forwardly extending portion of the J-bracket 154 are provided to cooperate with lock pins 172 in a manner similar to those on the corner bracket, intermediate bar and central support to accommodate adjustment.

With this arrangement, the hydraulic bar 110 can be extended forwardly and rearwardly by a conventional hydraulic piston to an extent to be in advance of the wheels of the car or truck to be lifted. Another conventional hydraulic piston 116 can be extended to raise or lower the wheel lift assembly 120. The intermediate bars 136 can then be adjusted laterally with respect to the corner brackets 140 and central support 134 with the associated lock pins 146 engaged to accommodate the car and tire width. The angling with regard to the horizontal of the rearwardly extending component 144 of the corner T-bracket 142 as well as the forwardly extending portion of the J-bracket will cause the end of the J-bracket to rest flush on the ground when the assembly is lowered. The J-bracket 154 is then secured to the corner T-bracket 140 for encompassing and lifting the front tires and allowing its towing. All of the weight is supported within the confines of the wheel lift assembly 120 for greater efficiency. Hooks 178 and 179 on the L-shaped bracket and J-bracket may be used to hold a rope, cable, chain, etc. as further securement of the vehicle being lifted and towed by the wheel lift.

Figures 8, 12:
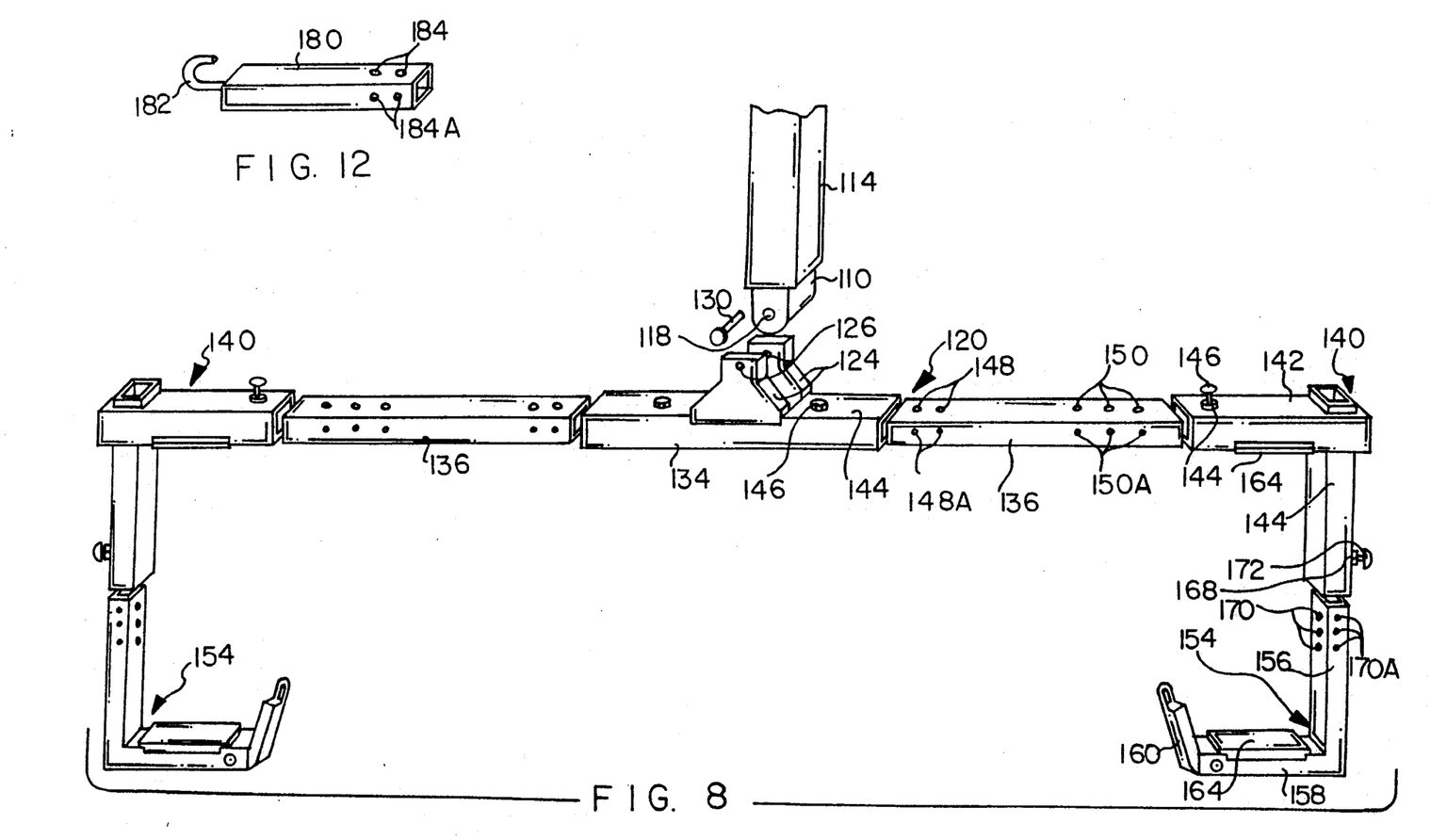
FIG. 8 is an enlarged perspective illustration of the wheel lift of FIG. 7.
FIG. 12 is a perspective illustration of an alternate lifting component for the wheel lift of the prior figures.
Figure 9:
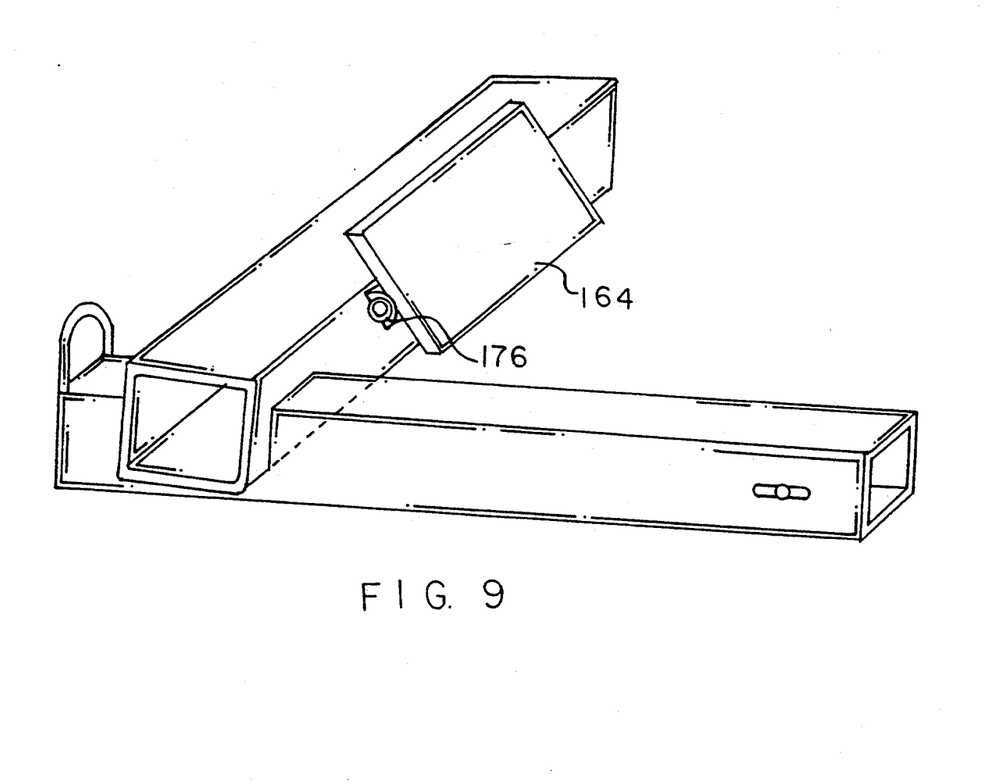
FIGS. 9 and 10 are enlarged perspective illustrations of components of the wheel lift of FIG. 8.
Figure 10:
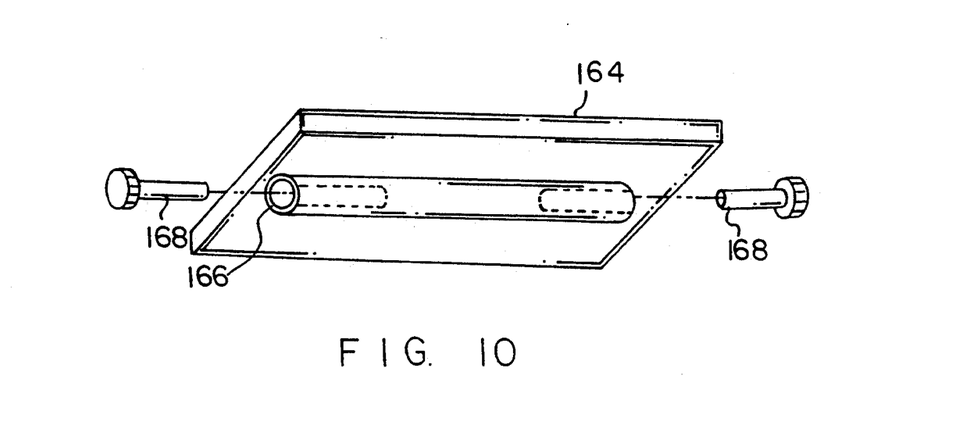

As an alternate approach as shown in FIG. 12, the wheel lift assembly 120 may be utilized without the intermediate extender bars 136, corner brackets 140, and J-brackets 154. Instead, the central support 134 is provided with optional brackets 180 of 2½ inch channel stock with a ¼-inch thickness each, having a hook 182 at remote end. Apertures 184 in the stock allow the end of a lock pin 146 to secure such optional units within the ends of the central support. In this manner, the hydraulic bar 110 and central support 134 may be used with chains for simply lifting one end of the car to be towed.

Figure 11:
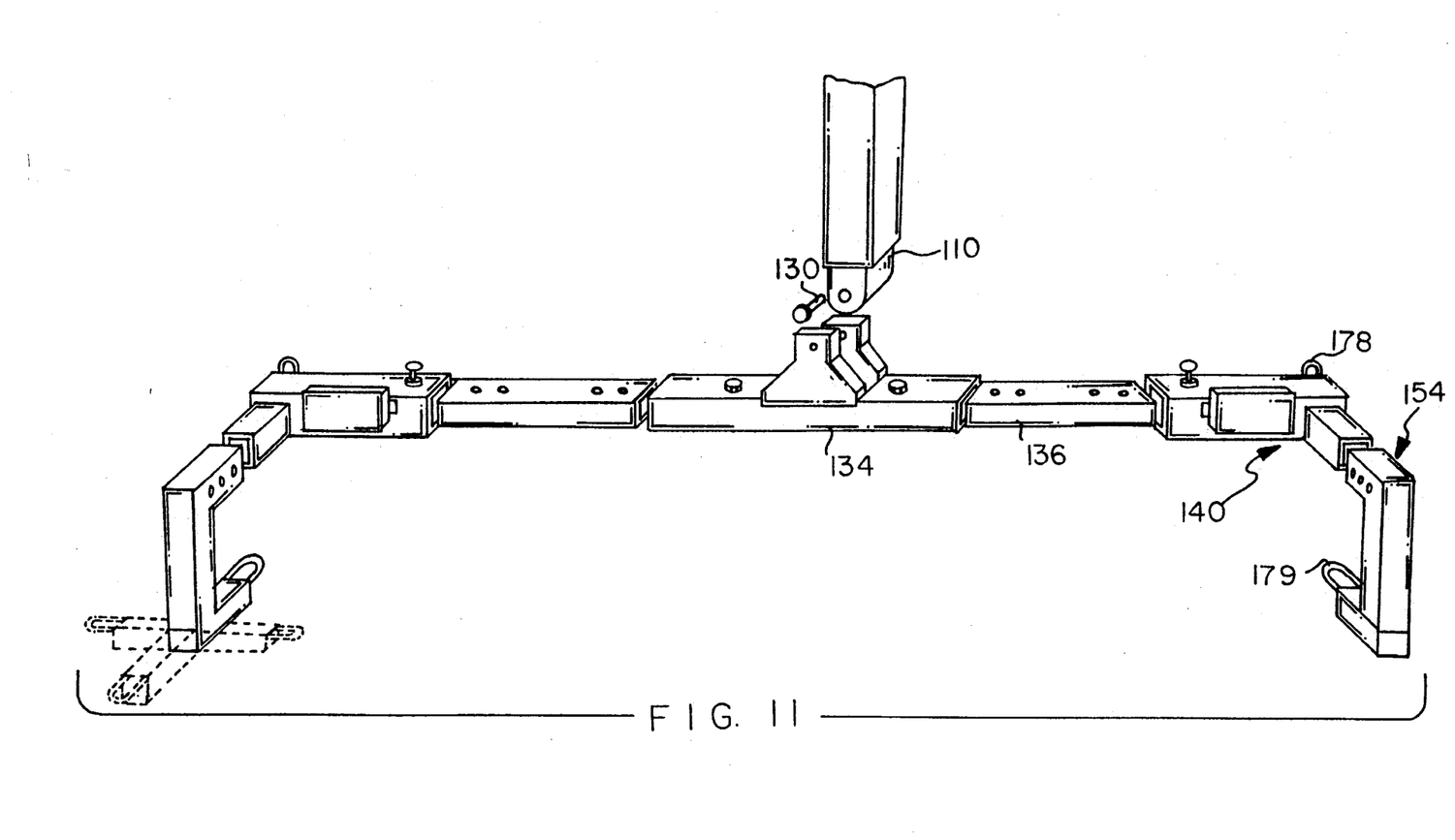
FIG. 11 is a perspective illustration similar to FIG. 8 but showing the components of the wheel lift in alternate orientations.

In a further alternate embodiment of the invention as shown in the dotted lines of FIG. 11, the corner brackets 140 are turned 90 degrees with respect to the primary embodiment of FIG. 8, whereby the wheel pads 164 are positioned on the upper surface and with the rearwardly extending component 144 extending upwardly. Thereafter, each J-bracket 154 is similarly turned 90 degrees, whereby its endmost component faces inwardly to form an S-shaped configuration. In this embodiment, a motorcycle can readily be transported being located across the rear of the support assembly. In another variation of this embodiment, each J-bracket 154 is turned as shown in the dotted line configuration of FIG. 11 for towing in a yet further mode.

The ability of the components of the assembly to assume various configurations is due to the various mating components being fabricated of channel iron with mating square cross-sectional configurations in combination with additional locking holes for being secured by various locking pins. More specifically, locking pins 146 and 172 couple with holes 148, 150 and 170 in the primary mode of FIG. 8, as well as holes 184 of FIG. 12. Additional alternate holes 148A, 150A, 170A and 184A are provided on adjacent faces of the opposite ends of the extender bars and the end of the elongated section of the J bracket. This allows the extender bar to be coupled to the central support 134 and corner bracket 140 and the J bracket 154 to be coupled to the L-shaped bracket in any rotational orientation to extend the utility of the wheel lift assembly 120.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of structures and the combination and arrangement of parts may be resorted to without departing from the spirit and scope of the invention.

Now that the invention has been described, what is claim:

1. A wheel lift assembly attachable to a liftable hydraulic bar extending rearwardly from a tow truck comprising;

central coupling brackets having a rearward end and a forward end removably attachable to a hydraulic bar of the tow truck;

a central support mounted to the rearward end of the coupling brackets;

a plurality of intermediate extender bars, each extender bar having a laterally interior end adjustably attached to the central support and also having a laterally exterior end;

a pair of corner brackets, each having a laterally extending component with an interior end adjustably coupled to the exterior end of an adjacent extender bar and having a rearwardly extending component secured at a right angle with respect to the laterally extending component;

a pair of J-shaped brackets each having an elongated section with a rectangular cross section forming four planar faces and with an end mountable in the rearwardly extending component of the corner bracket and having a transverse section and a forwardly extending end section, each elongated section having spaced apertures along each of its four planar faces to allow coupling with the corner bracket in any of four orientations; and a pair of tire pads pivotally coupled to each J-shaped bracket and corner bracket in facing relationship for receiving the wheel of a vehicle to be transported.

2. The assembly as set forth in claim 1 wherein the forwardly extending end section of each J-shaped bracket extends outwardly from the transverse section to form an obtuse angle with respect thereto and an acute angle with respect to the elongated section.

3. The assembly as set forth in claim 1 and further including loops on the corner brackets and the J-shaped brackets.

4. The assembly as set forth in claim 1 wherein the laterally extending component and the rearwardly extending component of each corner bracket are rotated about their axes whereby the J-shaped brackets are not in a common plane with the corner brackets.

* * * * *